(12) United States Patent
Iwai et al.

(10) Patent No.: US 11,175,564 B2
(45) Date of Patent: Nov. 16, 2021

(54) IMAGE CAPTURING APPARATUS

(71) Applicant: CANON KABUSHIKI KAISHA, Tokyo (JP)

(72) Inventors: Keita Iwai, Kawasaki (JP); Ryoji Okuno, Yokohama (JP); Hidetoshi Kei, Tokyo (JP); Jiro Yamamoto, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/740,190

(22) Filed: Jan. 10, 2020

(65) Prior Publication Data

US 2020/0249547 A1 Aug. 6, 2020

(30) Foreign Application Priority Data

Jan. 31, 2019 (JP) .............................. JP2019-016310

(51) Int. Cl.
| | |
|---|---|
| G03B 13/02 | (2021.01) |
| G03B 17/04 | (2021.01) |
| H04N 5/232 | (2006.01) |
| H04N 5/238 | (2006.01) |

(52) U.S. Cl.
CPC ............. *G03B 13/02* (2013.01); *G03B 17/04* (2013.01); *H04N 5/238* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 5,548,334 A | * | 8/1996 | Ichiyoshi | ......... H04N 5/225251 348/341 |
| 5,739,859 A | * | 4/1998 | Hattori | ............. H04N 5/225251 348/375 |
| 2002/0196358 A1 | * | 12/2002 | Kim | ................... H04N 5/23293 348/333.06 |
| 2005/0249491 A1 | | 11/2005 | Lu | |
| 2015/0029380 A1 | * | 1/2015 | Noh | ..................... H04N 5/2252 348/333.01 |
| 2015/0070559 A1 | * | 3/2015 | Faehrmann | ...... H04N 5/232933 348/333.01 |
| 2018/0213157 A1 | * | 7/2018 | Suzuki | ............. H04N 5/225251 |
| 2019/0025670 A1 | * | 1/2019 | Inaba | ..................... G03B 17/02 |
| 2020/0112660 A1 | * | 4/2020 | Nitto | .................. H04N 5/23293 |
| 2020/0117072 A1 | * | 4/2020 | Tominaga | .............. G03B 17/12 |
| 2020/0249547 A1 | * | 8/2020 | Iwai | ...................... G03B 17/04 |
| 2020/0252530 A1 | * | 8/2020 | Iwai | ...................... G03B 17/04 |

FOREIGN PATENT DOCUMENTS

| | | |
|---|---|---|
| CN | 1630345 A | 6/2005 |
| CN | 108351575 A | 7/2018 |
| JP | 07143368 A | 6/1995 |
| JP | 2003228097 A | 8/2003 |
| JP | 2017021303 A | 1/2017 |

* cited by examiner

*Primary Examiner* — William B Perkey
(74) *Attorney, Agent, or Firm* — Canon U.S.A., Inc. I.P. Division

(57) ABSTRACT

An image capturing apparatus includes an electronic viewfinder unit configured to move between a stored state stored in a main body and a projecting state projecting from the main body, wherein the electronic viewfinder unit is held to be able to turn in the projecting state and is held not to be able to turn in the stored state.

14 Claims, 8 Drawing Sheets

IMAGE CAPTURING APPARATUS

BACKGROUND OF THE DISCLOSURE

Field of the Disclosure

The present disclosure relates to an image capturing apparatus including an electronic viewfinder. Particularly, the present disclosure relates to a digital camera.

Description of the Related Art

Conventionally, there has been known a camera including an electronic viewfinder (hereinafter, also referred to as a finder) that can be turned relative to a camera main body to increase flexibility in image capturing posture of a user.

Japanese Patent Application Laid-Open No. 2017-021303 discuss an image capturing apparatus which can turn a finder using a rotation mechanism.

However, in a configuration described in Japanese Patent Application Laid-Open No. 2017-021303, a finder unit is always projecting from an external form of the camera.

Thus, the finder unit may be a hindrance to performing an image capturing operation and an obstacle to portability in carrying the camera while it is not used.

SUMMARY OF THE DISCLOSURE

The present disclosure is directed to an image capturing apparatus including a finder that does not project from a camera main body when the camera is not used by achieving miniaturization of the finder that can be turned relative to the camera main body.

According to an aspect of the present disclosure, an image capturing apparatus includes an electronic viewfinder unit configured to move between a stored state stored in a main body and a projecting state projecting from the main body, wherein the electronic viewfinder unit is held to be able to turn in the projecting state and is held not to be able to turn in the stored state.

Further features and aspects of the present disclosure will become apparent from the following description of example embodiments with reference to the attached drawings.

DESCRIPTION OF THE EMBODIMENTS

Figure 1A:
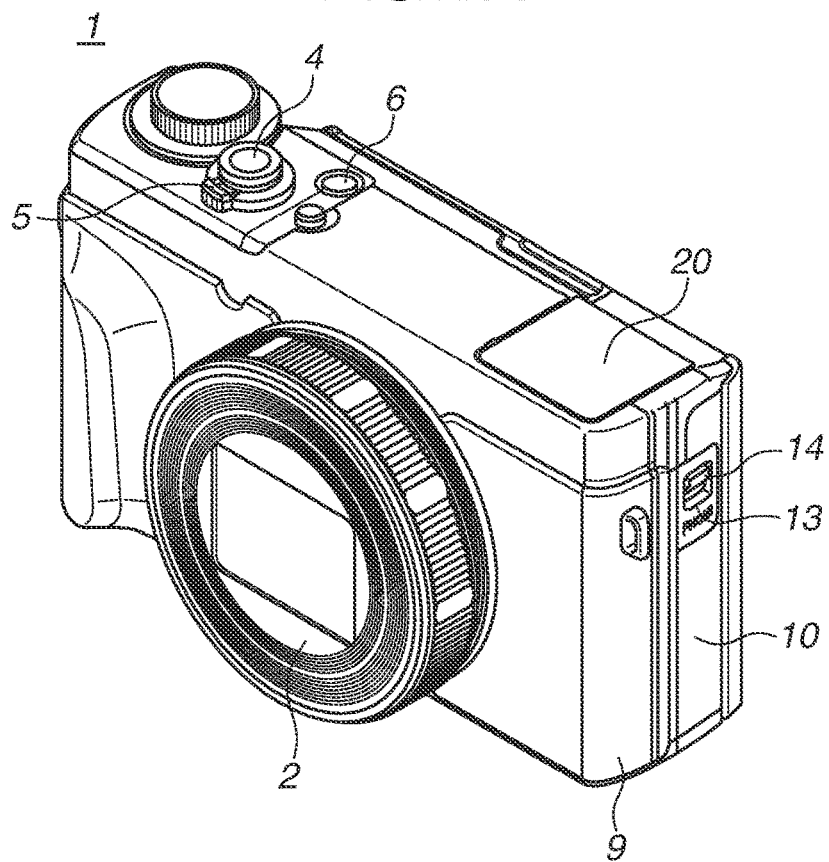
FIGS. 1A and 1B are perspective views each illustrating an image capturing apparatus according to an example embodiment of the present disclosure.

Example embodiments, and various features thereof, according to the present disclosure will be described in detail below with reference to the attached drawings. The same components are denoted by the same reference numerals in the drawings, and duplicated descriptions thereof are omitted.

A configuration of an image capturing apparatus 1) as an example of an image capturing apparatus according to an example embodiment of the present disclosure is described with reference to FIGS. 1A and 1B.

Figure 1B:
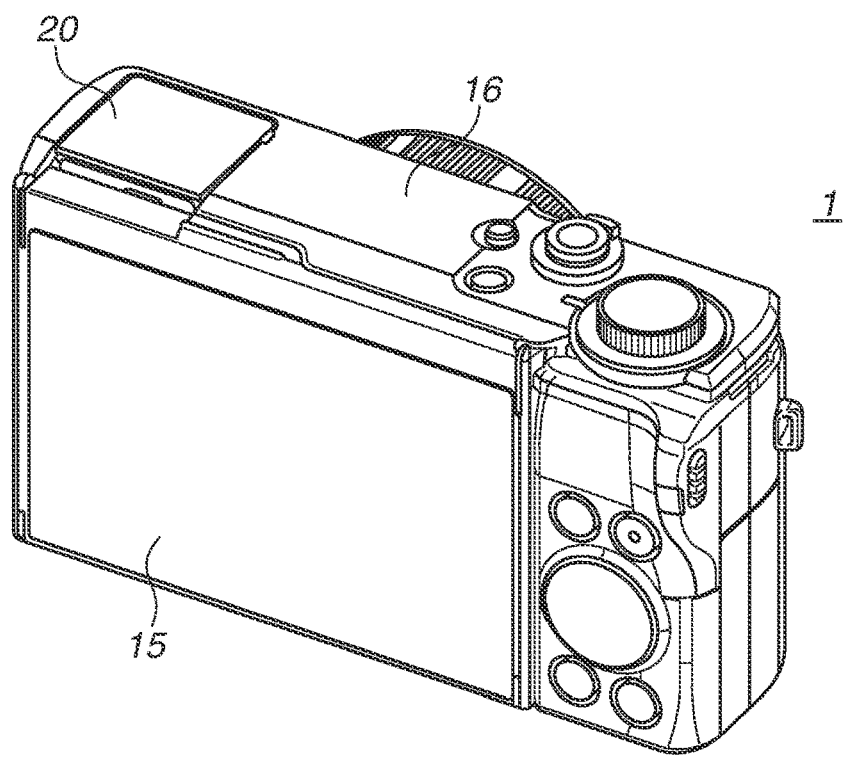

FIGS. 1A and 1B are perspective views illustrating the image capturing apparatus 1. FIGS. 1A and 1B are respectively a front perspective view and a rear perspective view of the image capturing apparatus 1.

The image capturing apparatus 1 includes a lens barrel unit 2 including an imaging optical system (not illustrated).

The image capturing apparatus 1 further includes an image pickup element (not illustrated) that photoelectrically converts an optical image of an object formed through a plurality of imaging lenses constituting the imaging optical system and generates image data.

The lens barrel unit 2 is retractable and is retracted into the image capturing apparatus 1 at a time of storage.

The image capturing apparatus 1 further includes a main board (not illustrated) and an auxiliary board (not illustrated) on which a processing circuit for converting the image data generated by the image pickup element into digital information is mounted.

In a case where a release button 4 is fully pressed, an image is captured, and image data of an object image is recorded in a storage medium (not illustrated).

A zoom lever 5 is held to be able to turn on an outer periphery of the release button 4. In a case where the zoom lever 5 is turned, a zoom operation is performed.

A power source button 6 is pressed by a user to switch between an on state (use state) and an off state (non-use state).

A display device 15 is provided on a rear surface of the image capturing apparatus 1 and is used to check the object image to be captured and to reproduce and display the captured image.

The image capturing apparatus 1 is covered with exterior members including a front cover 9, a rear cover 10, and a top cover 16.

The top cover 16 constitutes an outer appearance surface at a top of the image capturing apparatus 1 and an opening portion of a finder 20.

The finder 20 is built in the image capturing apparatus 1 and is locked in a state of being held inside the image capturing apparatus 1 by a lock mechanism at the time of storage.

A side cover 13 that forms a part of the outer appearance surface is provided on a side surface of the image capturing apparatus 1.

A release lever 14 that can be slid is held on the side cover 13. By the user operating the release lever 14, the finder 20 is unlocked and projected upward from the image capturing apparatus 1.

Next, an operation of the finder 20 according to the example embodiment of the present disclosure illustrated in FIGS. 1A and 1B is described with reference to FIGS. 2A to 2C.

Figure 2A:
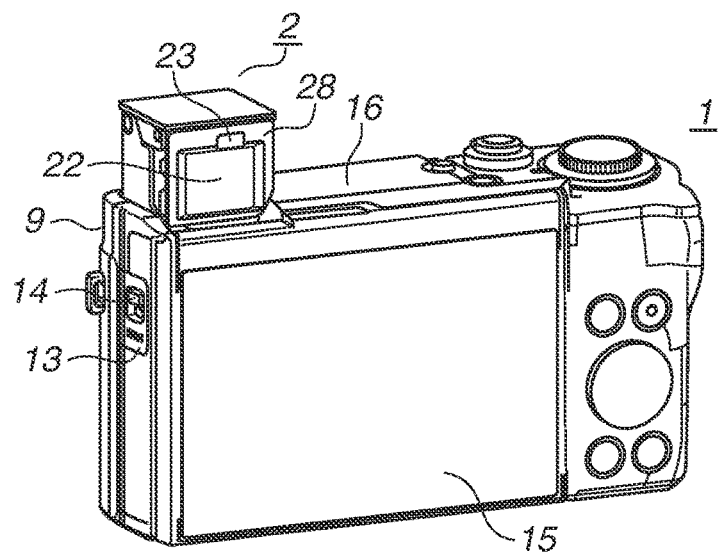
FIGS. 2A to 2C are perspective views each illustrating the image capturing apparatus from which a finder is projected.
Figure 2B:
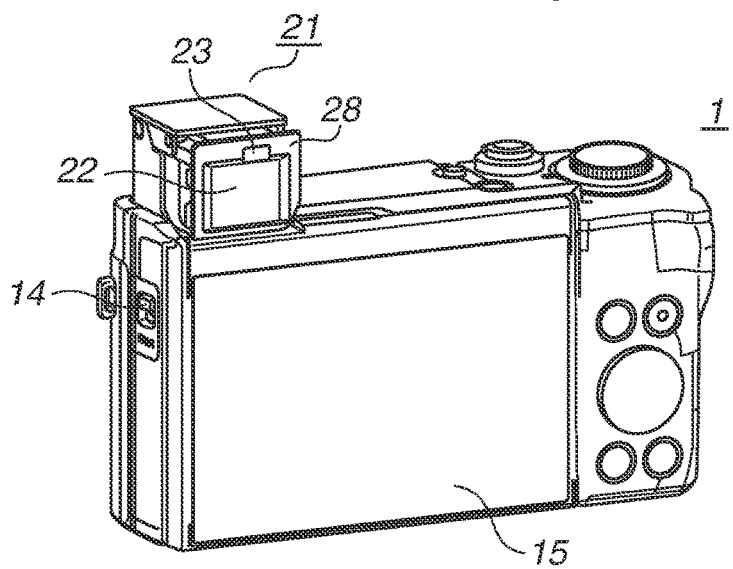
Figure 2C:
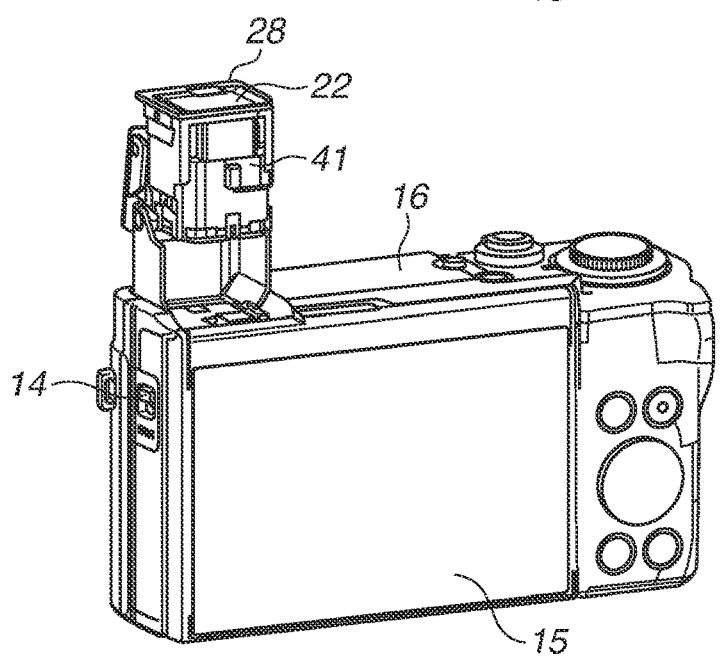

FIGS. 2A to 2C are rear perspective views each illustrating the image capturing apparatus 1 from which the finder 20 is projected.

FIG. 2A illustrates a state in which the finder 20 is projected upward from the image capturing apparatus 1 from a state of being stored therein by the user operating the release lever 14 arranged on the side surface of the above-described image capturing apparatus 1.

An eyepiece window 22 is fixed to an eyepiece 28. A sensor window 23 is disposed on an upper side of the eyepiece window 22.

The sensor window 23 is disposed for an optical path of an internal sensor such as an optical detection sensor.

The internal optical detection sensor detects that the user has looked into the eyepiece 28 and switches display to the finder 20.

FIG. 2B illustrates a state where the eyepiece 28 of the finder 20 is drawn out to a rear surface side of the image capturing apparatus 1 from the projected state of the finder 20 in FIG. 2A.

The finder 20 becomes available in the state where the eyepiece 28 is drawn out toward the user, and the user can check the object image to be captured and reproduction and display of the captured image through the eyepiece 28.

FIG. 2C illustrates a state where a finder turning unit 41 including the eyepiece 28 is turned in a state where the finder 20 is in an available state in FIG. 2B.

The finder turning unit 41 is turned approximately 90 degrees to a position at which the eyepiece 28 is parallel to the top cover 16.

In other words, the eyepiece window 22 is turned up to a state where the eyepiece window 22 faces a top surface of a camera main body.

Thus, the user can check the object image to be captured and the reproduction and display of the captured image from a top surface side of the camera.

A slide restraining mechanism is described that restrains a movement from the projecting state to the stored state with reference to FIGS. 3A to 3D.

The image capturing apparatus (also referred to as a camera main body) 1 includes an electronic viewfinder unit 21 that can move between the stored state of being stored in the camera main body 1 and the projecting state of being projecting from the camera main body 1.

The electronic viewfinder unit 21 is held to be able to turn in the projected state and not to be able to turn in the stored state.

A finder unit rotary shaft 50 is divided into two bodies, i.e., a first shaft penetrating through a first surface and a second shaft penetrating through a second surface.

In a case where an optical axis of a finder lens is parallel to an optical axis of the imaging optical system, the electronic viewfinder unit 21 can move from the projected state to the stored state.

The image capturing apparatus 1 includes a slide stopper (also referred to as a restraining unit) 39 that restrains the electronic viewfinder unit 21 from moving from the projected state to the stored state in a case where the optical axis of the finder lens forms a predetermined angle with the optical axis of the imaging optical system.

Figure 3A:
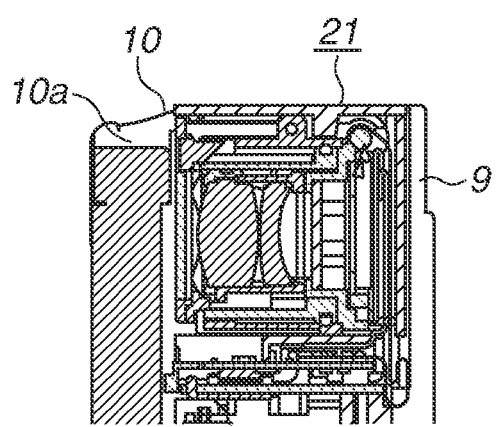
FIGS. 3A to 3D are diagrams each illustrating an example slide restraining mechanism.
Figure 3B:
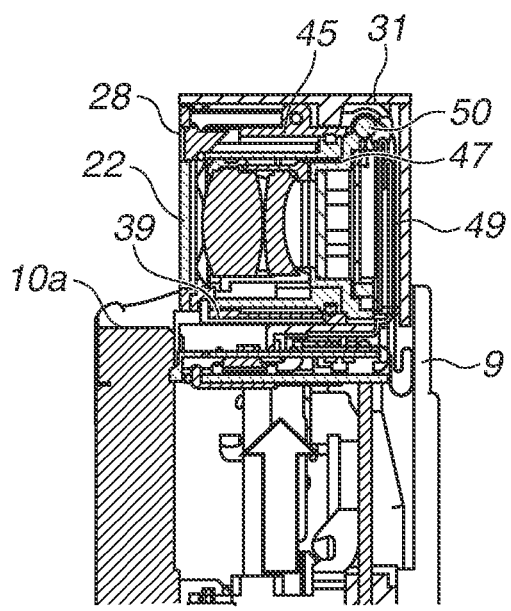

FIGS. 3A and 3B respectively illustrate the stored state and the projected state.

FIG. 3A illustrates a state in which the electronic viewfinder unit 21 is stored inside the camera main body 1.

FIG. 3B illustrates a state in which the electronic viewfinder unit 21 is projected upward from the camera main body 1 (in a direction of an arrow).

Figure 3C:
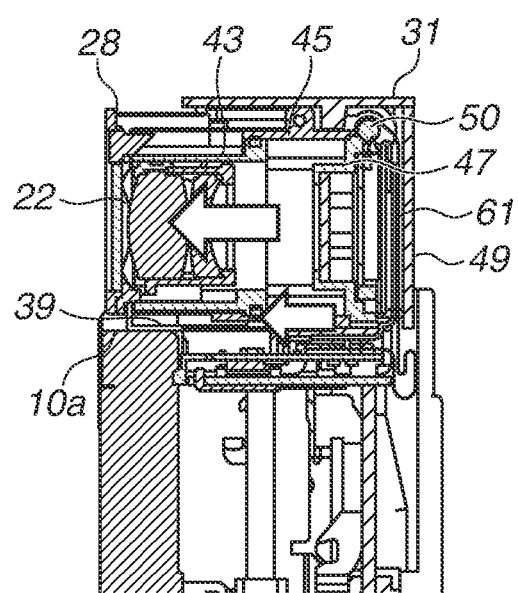
Figure 3D:
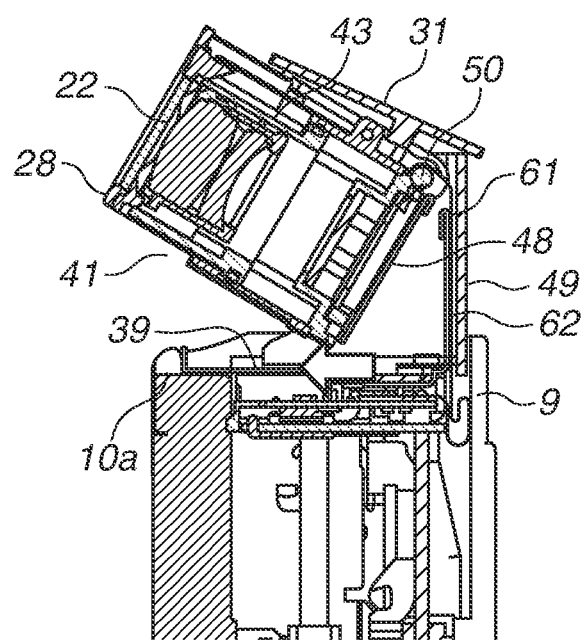

FIGS. 3C and 3D respectively illustrate a state where the eyepiece 28 is drawn out and a state where the finder turning unit 41 is turned.

As illustrated in FIGS. 3A and 3B, the electronic viewfinder unit 21 includes the slide stopper 39 and integrally performs a sliding operation in a vertical direction between the stored state and the projected state.

The rear cover 10, which is a part of the exterior, includes an exterior locking portion 10a.

Next, as illustrated in FIG. 3C, the slide stopper 39 is drawn out in conjunction with drawing out of the eyepiece 28 in a direction of an arrow and abuts on the exterior locking portion 10a.

Accordingly, the electronic viewfinder unit 21 is restrained from sliding into the stored state.

The slide stopper 39 is constantly urged in a direction of an arrow by a spring (not illustrated).

Thus, as illustrated in FIG. 3D, the slide stopper 39 maintains a state of abutting on the exterior locking portion 10a even if the finder turning unit 41 is turned.

Accordingly, the electronic viewfinder unit 21 is continuously restrained from sliding into the stored state in a state where the eyepiece 28 is drawn out.

As described above, the eyepiece 28 is drawn out after the electronic viewfinder unit 21 is in the projecting state, so that the electronic viewfinder unit 21 is restrained from moving in a stored state direction thereafter.

Accordingly, a failure such as the electronic viewfinder unit 21 drops unexpectedly when the camera is used and an image displayed on the finder 20 cannot be viewed can be prevented.

Transition to the stored state is performed in an opposite manner to the above-described one. The slide stopper 39 is released from being restrained by the exterior locking portion 10a, and the electronic viewfinder unit 21 is stored in the image capturing apparatus 1 by the operations in the order of FIGS. 3D, 3C, 3B, and 3A.

Next, a configuration of the finder 20 is described with reference to FIGS. 4A and 4B.

Figure 4A:
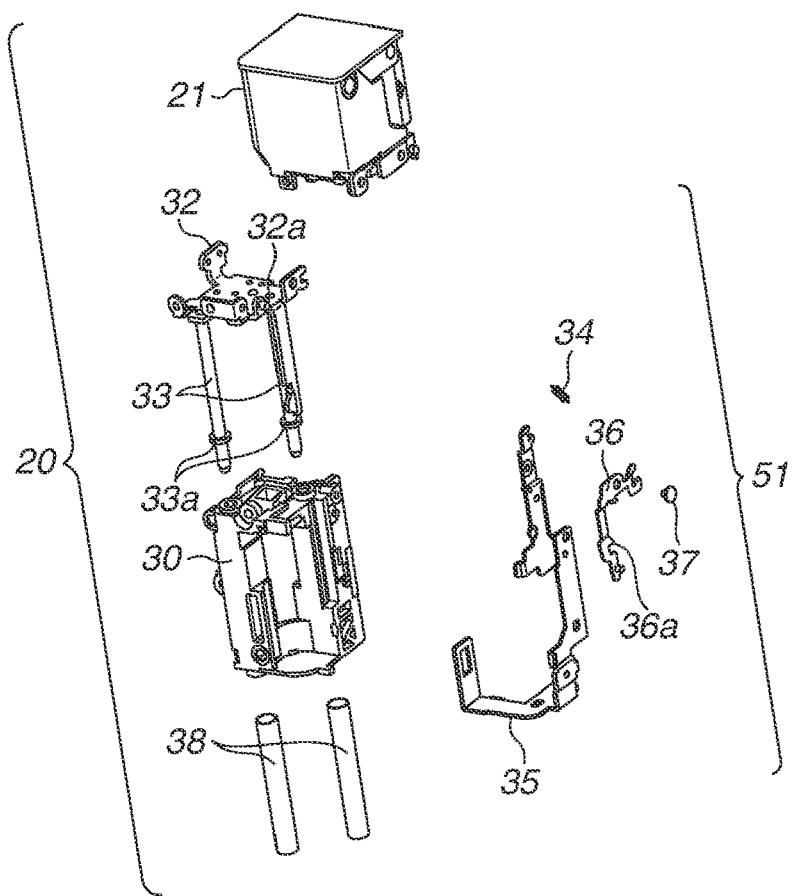
FIGS. 4A and 4B are perspective development views each illustrating an example configuration of the finder.
Figure 4B:
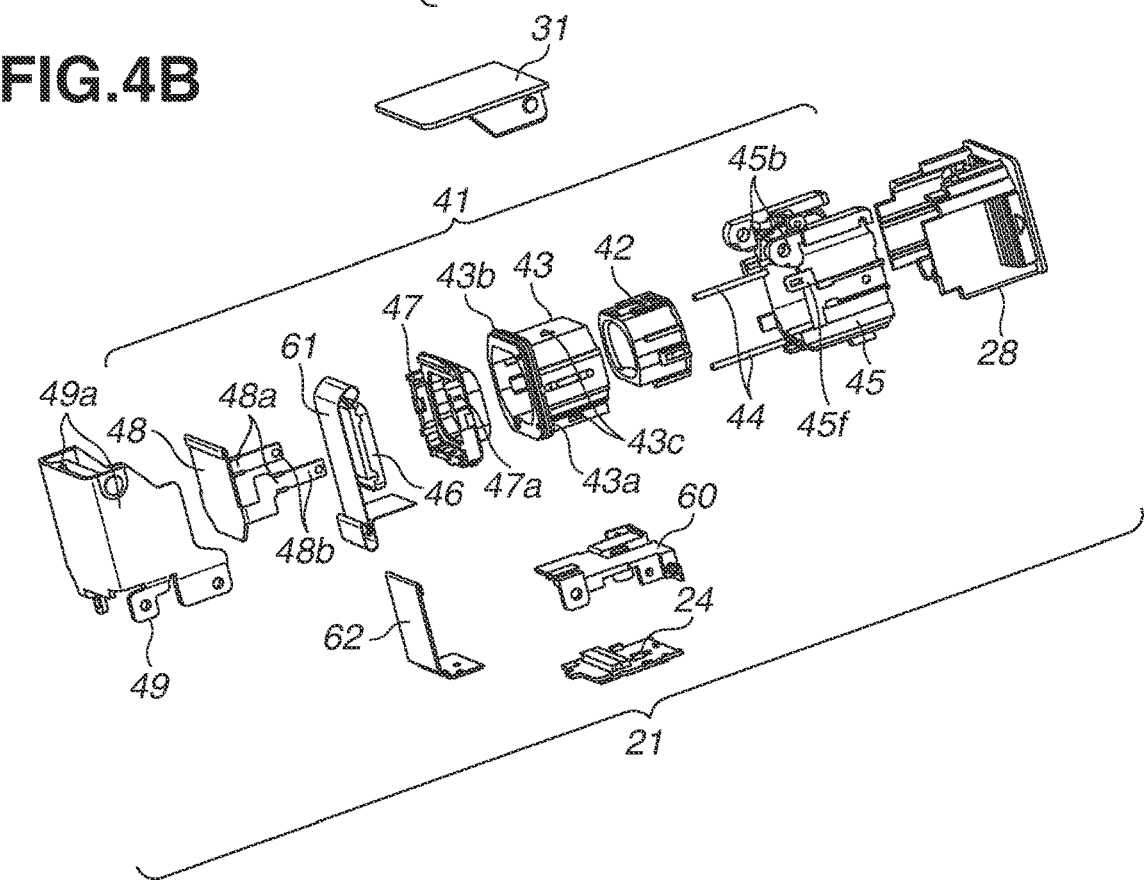

FIGS. 4A and 4B are perspective development views of the finder 20.

The electronic viewfinder unit 21 includes the finder turning unit (turning unit) 41 that includes an electronic display unit 46, the eyepiece 28, and a lens holder 42 holding the finder lens for guiding a light beam emitted from the electronic display unit 46 to the eyepiece 28.

The electronic viewfinder unit 21 further includes an exterior cover 49 that covers the finder turning unit 41.

The finder turning unit 41 can be turned around the finder unit rotary shaft 50, which is perpendicular to the optical axis of the finder lens held by the exterior cover 49, in the projecting state.

The finder unit rotary shaft 50 is provided on a side opposite to the eyepiece 28 with respect to the optical axis of the finder lens relative to the lens holder 42 and on a side to which the electronic viewfinder unit 21 projects of the optical axis of the finder lens.

As illustrated in FIG. 4A, the finder 20 includes the electronic viewfinder unit 21, and a vertical movement pop-up mechanism unit 51 that switches between the stored state and the projecting state.

FIG. 4A is the perspective development view illustrating the vertical movement pop-up mechanism unit 51 included in the finder 20.

A base plate 32 is formed of a metal plate, and two guide bars 33 formed of a metal material are swaged thereto.

An engaging pin 32a is formed on the base plate 32.

A flange shape portion 33a is formed on each of the guide bars 33 to partially increase a size of the guide bar 33 in a radial direction.

An electronic viewfinder (EVF) holder 30 is formed of a resin material and held to be slidable in a vertical direction with the two guide bars 33, which are swaged to the above-described base plate 32, inserted into the EVF holder 30.

The flange shape portion 33a of the guide bar 33 comes in contact with the EVF holder 30, and thus a slide position when the electronic viewfinder unit 21 is projected is determined.

The EVF holder 30 is positioned and fixed with respect to the front cover 9 illustrated in FIG. 1A.

A projection spring 38 is stored inside the EVF holder 30 and urges the guide bar 33 upwards.

A spring holder 35 is formed of a sheet metal material and fixed to the EVF holder 30 to hold an end portion of the projection spring 38.

A lock lever 36 is held, with a swaging pin 37, to be able to turn with respect to the spring holder 35, and includes an engaging claw portion 36a.

An urging spring 34 is held by being engaged with the lock lever 36 at one end and engaged with the spring holder 35 at the other end, and urges the lock lever 36 in one direction.

The lock lever 36 is configured to perform a turning operation around the swaging pin 37 in a case where the release lever 14 illustrated in FIG. 1A is operated.

The engaging pin 32a of the base plate 32 is engaged with the engaging claw portion 36a of the lock lever 36 at the time of storage, and thus the finder 20 is maintained in the stored state.

In a case where the finder 20 is used, the release lever 14 is operated, the lock lever 36 turns to release engagement of the engaging pin 32a, and thus a projection operation is performed.

Next, a configuration of the electronic viewfinder unit 21 is described.

FIG. 4B is the perspective development view of the electronic viewfinder unit 21.

The electronic viewfinder unit 21 includes a finder top cover 31 constituting the outer appearance surface of the top surface together with the top cover 16.

The electronic viewfinder unit 21 also includes the exterior cover 49 including two side surfaces 49a that are parallel in a movable direction in the projecting state.

The exterior cover 49 includes a first side surface located on a left side and a second side surface located on a right side of the optical axis of the finder lens.

The finder turning unit 41 included in the electronic viewfinder unit 21 includes the lens holder 42 that holds the finder lens, a finder guide barrel 43 that holds the lens holder 42 in a linearly movable manner, and a flange portion 43a of the finder guide barrel 43.

A guide shaft 44, which guides the finder guide barrel 43 in a linearly movable manner, penetrates through the flange portion 43a.

One end of the guide shaft 44 is fixed to a finder fixed barrel 45.

The eyepiece 28 is engaged with the finder guide barrel 43 with an engaging projection 43c provided on a side surface of the finder guide barrel 43.

In a case where the eyepiece 28 is drawn out toward the user, the finder guide barrel 43 supported by the guide shaft 44 performs a translational movement integrally with the lens holder 42 inside thereof, and thus the eyepiece 28 becomes available.

A sealing member 43b is provided on an outer periphery of the flange portion 43a of the finder guide barrel 43. The sealing member 43b seals a gap between the finder fixed barrel 45 and the finder guide barrel 43 to form a dust-proof structure portion.

A display unit holder 47 holds the electronic display unit 46.

An engaging projection 47a is provided on a side surface of the display unit holder 47 and is integrated with an engaging portion 45f on a side of the finder fixed barrel 45.

A display panel urging plate 48 includes an arm portion 48a fixed to the finder fixed barrel 45 and urges the electronic display unit 46 toward the display unit holder 47.

A leading end 48b of the arm portion 48a serves as a clicking unit with respect to the finder guide barrel 43 that integrally moves in a case where the eyepiece 28 is drawn out toward the user.

A board base 60 is provided between a lower part of the electronic viewfinder unit 21 and the vertical movement pop-up mechanism unit 51 that switches between the stored state and the projecting state.

The board base 60 is fixed to the base plate 32 together with the exterior cover 49 with a plurality of fastening screws.

A finder board 24 is fixed to the board base 60.

The finder board 24 is connected to a flexible board (not illustrated) for transmitting an image signal from the main board inside the image capturing apparatus 1, and the signal is transmitted by a flexible board 61 connected to the electronic display unit 46.

A flexible board cover 62 is fixed to the board base 60.

Next, the exterior cover 49 and a finder turning operation are described with reference to FIG. 5.

Figure 5:
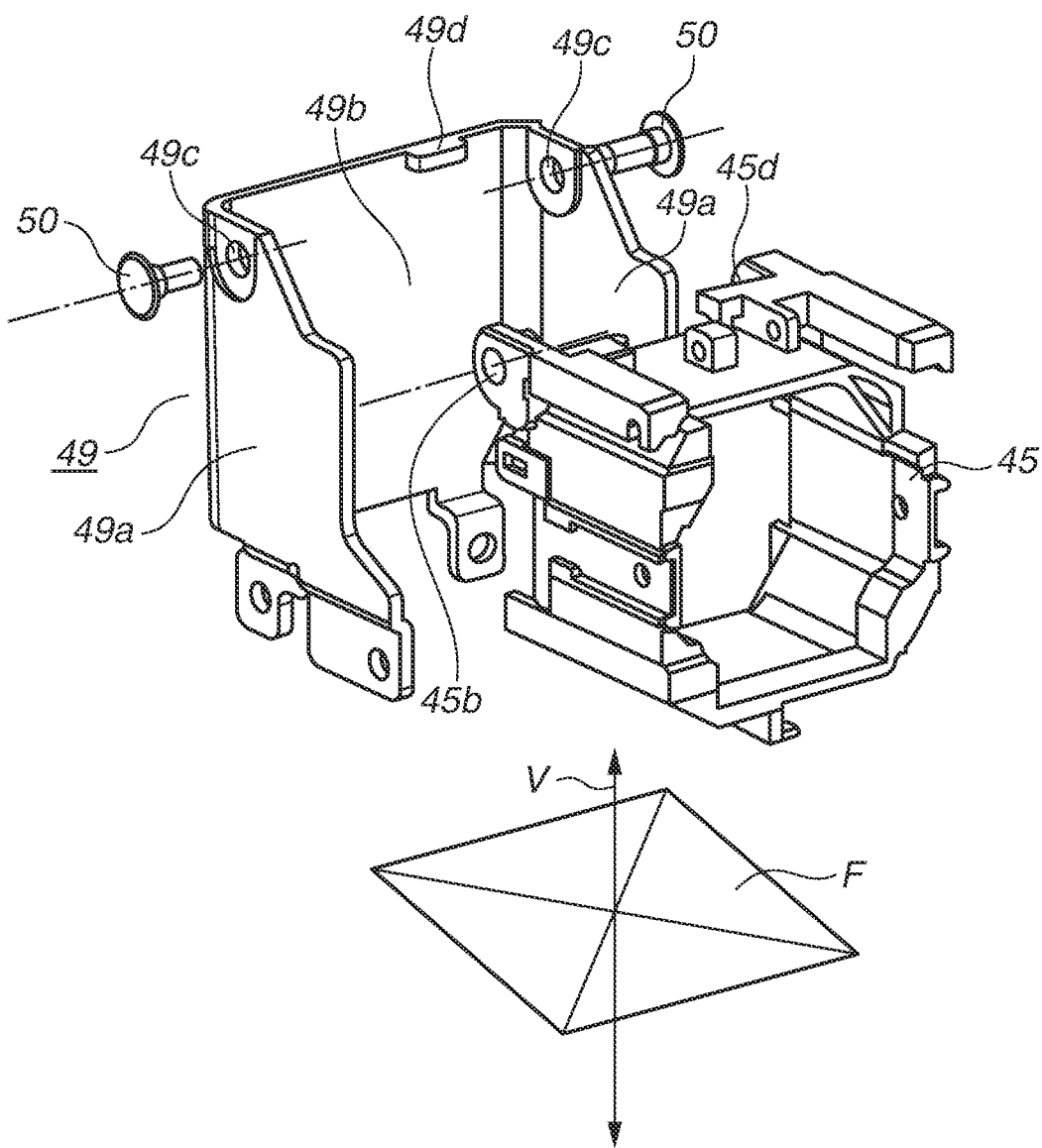
FIG. 5 is a view illustrating an example exterior cover and a finder turning operation.

FIG. 5 illustrates a relationship between the exterior cover 49 and the finder fixed barrel 45.

The exterior cover 49 includes the first and second side surfaces 49a that are parallel to an optical axis direction of the finder lens and parallel to a movable direction of the electronic viewfinder unit 21, and the finder unit rotary shaft 50 is held by the first and second side surfaces 49a.

The first and second side surfaces 49a are connected by a third side surface 49b located closer to an object than the first and second side surfaces 49a are, and the first and second side surfaces 49a and the third side surface 49b form a U shape in a cross section perpendicular to a storage direction.

The finder unit rotary shaft 50 is fitted into a shaft hole portion 45b provided on the finder fixed barrel 45 included in the finder turning unit 41 in a turnable manner, and is held by the first and second side surfaces 49a of the exterior cover 49.

The finder unit rotary shaft 50 is held by hole portions 49c each provided on each of the side surfaces 49a constituting the exterior cover 49.

The finder unit rotary shaft 50 is combined with the exterior cover 49 having rigidity to secure strength as the rotary shaft.

In the finder fixed barrel 45, part of the finder unit rotary shaft 50 is turnably fitted into the shaft hole portion 45b.

Accordingly, the finder fixed barrel 45 can turn with respect to the exterior cover 49. The exterior cover 49 includes a turning stopper portion 49d.

The finder fixed barrel 45 has a configuration in which a contact portion 45d comes in contact with the turning stopper portion 49d if the finder fixed barrel 45 turns approximately 90 degrees.

The finder turning unit 41 can turn between zero degrees at which the optical axis of the finder lens is substantially parallel to the optical axis of the imaging optical system and 90 degrees.

According to the present example embodiment, the finder unit rotary shaft 50 is divided into two members such as screws, but may be formed by a single member.

A friction member (not illustrated) for imparting friction is put between the exterior cover 49 and the shaft hole portion 45b provided on the finder fixed barrel 45.

The friction member is, for example, a disc spring or an O-ring and can stop the turning operation at any position by a frictional force imparted by the friction member.

The exterior cover 49 includes the side surfaces 49a, which are two parallel flat plates, and the side surface 49b, which is located on the object side and connects the two side surfaces 49a.

The exterior cover 49 has a substantially U shape on a cross section F perpendicular to a movable direction V between the stored state and the projecting state.

The side surfaces 49a, which are the two parallel surfaces constituting the exterior cover 49, are each provided with the hole portion 49c.

The hole portions 49c provided on the exterior cover 49 are located on an opposite side of the eyepiece window 22 and in an upper part of the electronic viewfinder unit 21 in the image capturing apparatus 1.

The finder turning unit 41 is operated to move away from the exterior members such as the top cover 16 and the front cover 9 of the image capturing apparatus 1 in the turning operation of the electronic viewfinder unit 21, so that no portion interferes with the image capturing apparatus 1 in the turning operation.

The third side surface 49b on the object side is perpendicular to the optical axis of the finder lens.

Thus, the exterior cover 49 has the substantially U shape on the cross section perpendicular to the movable direction between the stored state and the projecting state and can secure strength necessary for the turning operation.

Next, the finder turning unit 41 included in the electronic viewfinder unit 21 is described with reference to FIGS. 6A to 6C.

Figure 6A:
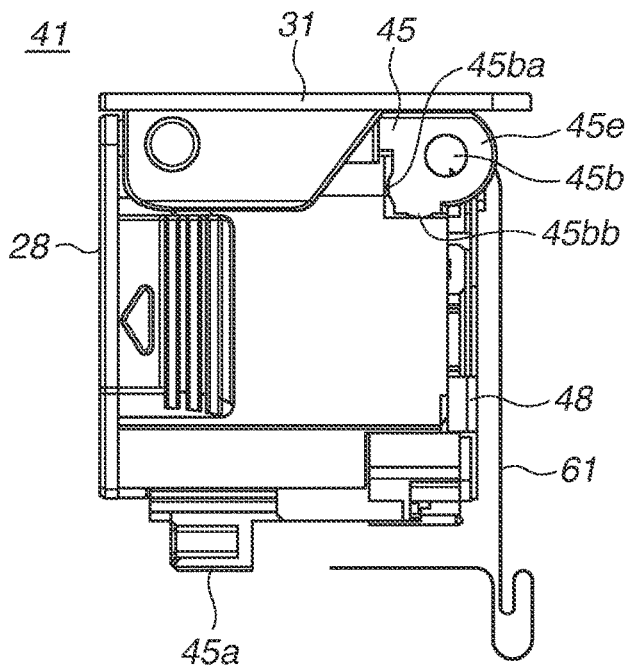
FIGS. 6A to 6C are diagrams each illustrating an example finder turning unit.

FIG. 6A illustrates the finder turning unit 41 viewed from a side surface thereof.

The finder turning unit 41 includes the finder guide barrel 43 that is stored in the finder fixed barrel 45 in a linearly movable manner and holds the lens holder 42.

The finder guide barrel 43 is engaged with the eyepiece 28.

A bearing portion 45e of the finder fixed barrel 45 on which the eyepiece 28 is formed includes a first contact portion 45ba that comes in contact with a surface of the eyepiece 28 parallel to a display surface of the electronic display unit 46.

The bearing portion 45e includes a second contact portion 45bb that comes in contact with a surface of the eyepiece 28 parallel to the optical axis of the finder lens.

A engaging portion 45a is provided at a lower part of the finder fixed barrel 45 to regulate the turning operation of the finder turning unit 41 in the projecting state.

The bearing portion 45e is provided on an upper part of the finder fixed barrel 45 to pivotally support the finder fixed barrel 45 to be able to turn relative to the exterior cover 49 forming the outer appearance surface.

The shaft hole portion 45b is formed in the bearing portion 45e.

The bearing portion 45e further includes the first contact portion 45ba.

The first contact portion 45ba comes in contact with the surface of the eyepiece 28 parallel to the display surface of the electronic display unit 46.

The bearing portion 45e further includes the second contact portion 45bb. The second contact portion 45bb comes in contact with the surface of the eyepiece 28 parallel to the optical axis of the finder lens.

The shaft hole portion 45b is fitted with the finder unit rotary shaft 50, and thus has rigidity.

The bearing portion 45e of the finder fixed barrel 45 includes the first contact portion 45ba and the second contact portion 45bb, and thus an abutting surface and a sliding surface of the eyepiece 28 at the time of storage are provided on a portion having rigidity in the finder fixed barrel 45.

Accordingly, reliability of an operation of the eyepiece 28 can be improved.

Figure 6B:
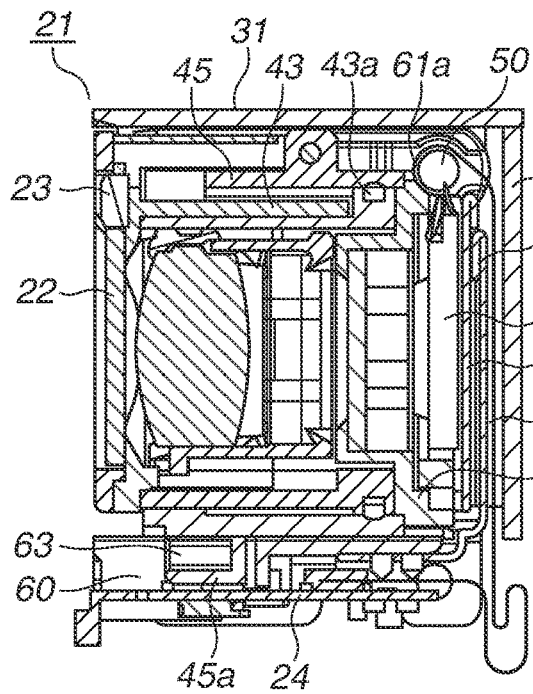

FIG. 6B is a cross-sectional view of the electronic viewfinder unit 21 illustrated in FIGS. 4A and 4B.

The finder unit rotary shaft 50 is provided on a side to which the electronic viewfinder unit 21 projects out of the electronic display unit 46 in a cross section in a direction perpendicular to the finder unit rotary shaft 50.

The finder unit rotary shaft 50 is arranged to be within projection in a thickness direction of the electronic display unit 46.

The finder unit rotary shaft 50 does not affect the dust-proof structure portion between the flange portion 43a of the finder guide barrel 43 and the finder fixed barrel 45. Accordingly, an internal layout of the electronic viewfinder unit 21 can be made in a space-saving manner.

One end of the flexible board 61 is connected to the electronic display unit 46 on a side of the finder unit rotary shaft 50.

The flexible board 61 has a radius (R) portion 61a having a center substantially the same as a center of the finder unit rotary shaft 50, and is disposed to pass through a gap between the flexible board cover 62 and the exterior cover 49.

The finder unit rotary shaft 50 is perpendicular to the optical axis of the finder lens.

Figure 6C:
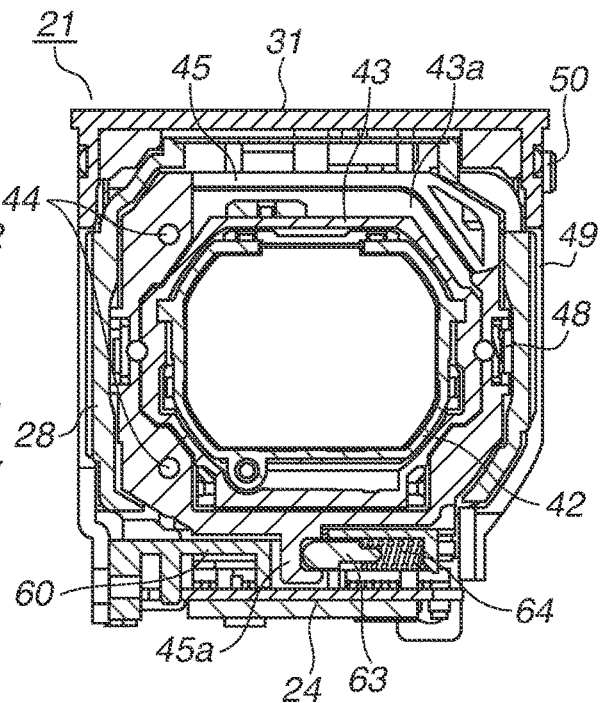

FIG. 6C illustrates a cross section perpendicular to the optical axis of the finder lens in the electronic viewfinder unit 21.

An engaging member 63 is slidably attached to the board base 60 by an urging spring 64.

The engaging member 63 regulates a turning operation of the engaging portion 45a provided at the lower part of the finder fixed barrel 45.

The engaging member 63 is retracted against the urging spring 64 in the turning operation of the finder turning unit 41, and the engaging portion 45a gets over the engaging member 63.

Accordingly, the finder turning unit 41 included in the electronic viewfinder unit 21 is locked in a state parallel to the optical axis of the finder lens and an imaging lens (not illustrated).

Next, a layout of a detection sensor 71 and a detection sensor flexible board 72 in the finder turning unit 41 is described with reference to FIGS. 7A to 7C.

As illustrated in FIGS. 6A to 6C and FIG. 7B, the sensor window 23 is provided in an upper part of the eyepiece window 22 included in the eyepiece 28. The internal detection sensor 71 is, for example, a proximity sensor and switches the display to the finder 20 when detecting that a user has looked into the eyepiece 28.

The detection sensor 71 and the sensor window 23 are provided in the upper part of the eyepiece window 22, and thus the detection sensor 71 can detect that a user has looked into the eyepiece 28 within a range in which the finder turning unit 41 has been turned.

The camera main body 1 includes the electronic viewfinder unit 21 that projects from the camera main body 1.

The finder turning unit 41 includes the electronic display unit 46, the flexible board (first flexible board) 61 connected to the electronic display unit 46, and the lens holder 42 that holds the finder lens.

The finder turning unit 41 further includes the detection sensor 71 that detects that a user has approached the eyepiece 28, the eyepiece window 22 provided on a front surface of the eyepiece 28, and the sensor window 23 provided in a direction in which the electronic viewfinder unit 21 projects from the eyepiece window 22.

The electronic viewfinder unit 21 includes the finder turning unit 41 and the exterior cover 49 that covers the finder turning unit 41.

The finder turning unit 41 can turn around the finder unit rotary shaft 50 perpendicular to the optical axis of the finder lens held by the exterior cover 49 in the projecting state.

The first flexible board 61 extends from a connection portion with the electronic display unit 46 toward the finder unit rotary shaft 50.

The exterior cover 49 includes the first and second side surfaces 49a that are parallel to the optical axis direction of the finder lens and parallel to the movable direction of the electronic viewfinder unit 21, and the finder unit rotary shaft 50 is held by the first and second side surfaces 49a.

The finder turning unit 41 includes the finder top cover 31 that covers a top surface of the finder fixed barrel 45.

A second overlap portion 72c is disposed between the finder fixed barrel 45 and the finder top cover 31, and is disposed in an area having a width W of a mounting portion 72a in a plane perpendicular to the optical axis of the finder lens.

Figure 7A:
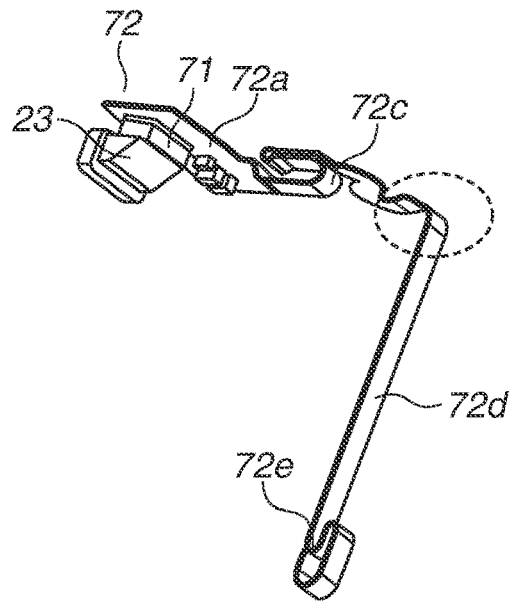
FIGS. 7A to 7C are diagrams each illustrating an example detection sensor and a detection sensor flexible board.

As illustrated in FIG. 7A, the detection sensor 71 is mounted on the detection sensor flexible board 72 together with peripheral circuit components.

The finder turning unit 41 includes the finder guide barrel 43, which is engaged with the eyepiece 28 and holds the lens holder 42, and the finder fixed barrel 45 that stores the finder guide barrel 43 in a linearly movable manner.

The finder turning unit 41 further includes the finder top cover 31 that covers the top surface of the finder fixed barrel 45, the mounting portion 72a on which the detection sensor 71 is mounted, and the detection sensor flexible board (also referred to as a second flexible board) 72 that extends from the mounting portion 72a toward the main body.

The first flexible board 61 includes a first overlap portion in which a flexible portion is folded.

The second flexible board 72 includes the second overlap portion 72c in which the flexible portion is folded on a side close to the sensor window 23, and a third overlap portion 72e in which the flexible portion is folded on a side far from the sensor window 23.

The first flexible board 61 and the second flexible board 72 are wound around the finder unit rotary shaft 50.

In a case where the eyepiece 28 is drawn out toward the user, the second overlap portion 72c of the second flexible board 72 is extended.

In a case where the finder turning unit 41 turns around the finder unit rotary shaft 50, the first overlap portion of the first flexible board 61 and the third overlap portion 72e of the second flexible board 72 are extended.

The mounting portion 72a on which the detection sensor 71 of the detection sensor flexible board 72 is mounted is integrated with the sensor window 23 with a fixing unit (not illustrated).

Figure 7B:
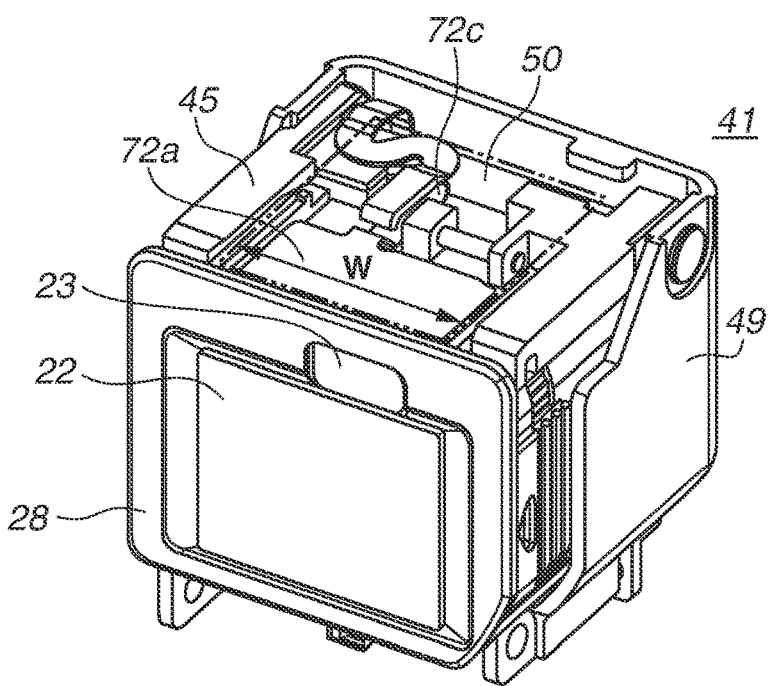
Figure 7C:
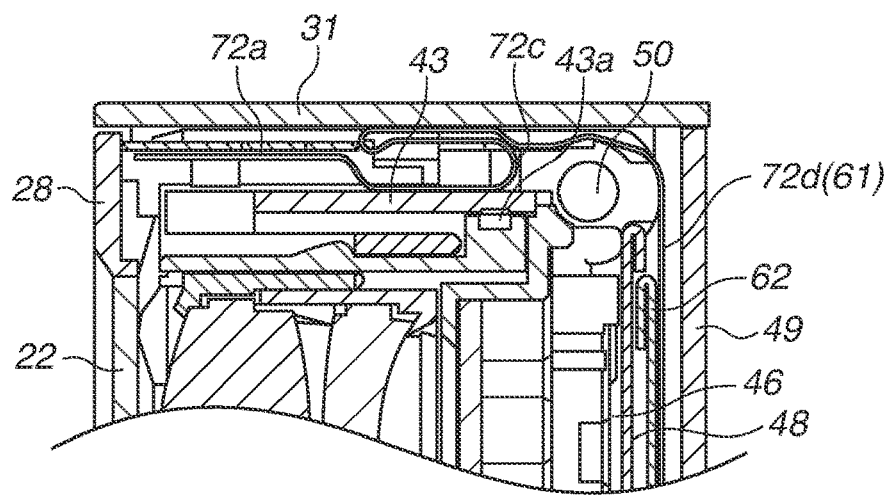

FIGS. 7B and 7C illustrate a configuration and an arrangement of the detection sensor flexible board 72.

The second flexible board 72 is disposed in a gap between the flexible board cover 62, which is adjacent to the first flexible board 61 and guides the first flexible board 61 to the camera main body 1, and the exterior cover 49.

The second overlap portion (also referred to as a first movable surplus length portion) 72c extending from the mounting portion 72a is stored between the finder top cover 31 and the finder fixed barrel 45.

Further, the first movable surplus length portion 72c is disposed within the width W of the mounting portion 72a viewed from a direction of the eyepiece 28.

The first movable surplus length portion 72c moves when the eyepiece 28 is drawn out toward the user and performs the translational movement.

Accordingly, the first movable surplus length portion 72c can be disposed without impairing an arrangement of the finder unit rotary shaft 50 constituting a movable portion of the finder turning unit 41 or hindering the turning operation.

As illustrated in FIG. 7B, the sensor window 23 is provided in the upper part of the eyepiece window 22 included in the eyepiece 28, and accordingly, the detection sensor flexible board 72 can be arranged in a space-saving manner.

An extension portion 72d, which extends from the first movable surplus length portion 72c, of the detection sensor flexible board 72 is disposed to be adjacent to the flexible board 61, which is connected to the electronic display unit 46, and to pass through the gap between the flexible board cover 62 and the exterior cover 49.

The third overlap portion (also referred to as a second movable surplus length portion) 72e is disposed to extend from the extension portion 72d. The detection sensor flexible board 72 is wound around the finder unit rotary shaft 50 in a region 72m from the first movable surplus length portion 72c to the extension portion 72d. Accordingly, the second movable surplus length portion 72e is extended without hindering the turning operation in a case where the detection sensor flexible board 72 turns around the finder unit rotary shaft 50.

Accordingly, the detection sensor flexible board 72 enables the eyepiece 28 to perform the translational movement without hindering the turning operation of the finder turning unit 41 or impairing the configuration of the finder unit rotary shaft 50.

Since the extension portion 72d of the detection sensor flexible board 72 is not exposed to the outside and is protected when the finder turning unit 41 is turned, the reliability can be improved.

Figure 8A:
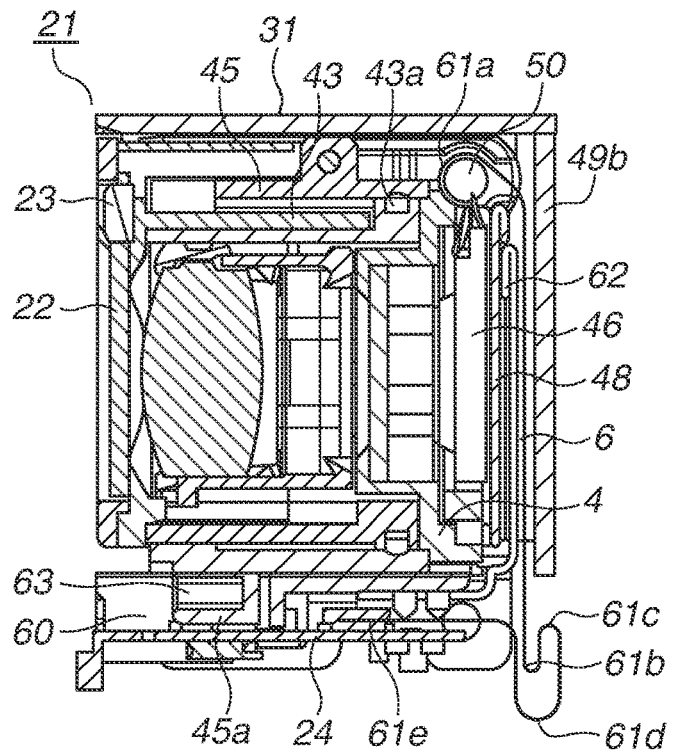
FIGS. 8A and 8B are diagrams each illustrating a layout of a flexible board.

FIG. 8A is a cross-sectional view perpendicular to the finder unit rotary shaft 50 of the electronic viewfinder unit 21.

One end of the flexible board 61 is connected to the electronic display unit 46 on the side of the finder unit rotary shaft 50.

The flexible board 61 is a flexible printed wiring board using a resin such as polyimide as a base material and having a thickness of about 0.1 to 0.2 mm.

The flexible board 61 has the R portion 61a having the center substantially the same as the center of the finder unit rotary shaft 50, and is disposed to pass through the gap between the flexible board cover 62 and the exterior cover 49.

The flexible board cover 62 is formed of a metal plate. Hemming processing in which a plate is folded 180 degrees is applied to an end face of the flexible board cover 62 on a side closer to the finder unit rotary shaft 50.

Thus, the flexible board 61 does not come into contact with the end face of the flexible board cover 62.

Accordingly, the turning operation of the finder turning unit 41 can be performed without impairing the arrangement configuration of the finder unit rotary shaft 50.

The finder unit rotary shaft 50 is divided into two members, but may be configured as a single member.

The flexible board 61 is not exposed when the finder turning unit 41 is turned inside the exterior cover 49 and is protected by the flexible board cover 62, so that the reliability can be improved.

The flexible board 61 is disposed so as to form a plurality of R portions such as an R portion 61*b*, an R portion 61*c*, and an R portion 61*d* after passing through the gap between the flexible board cover 62 and the exterior cover 49.

Figure 8B:
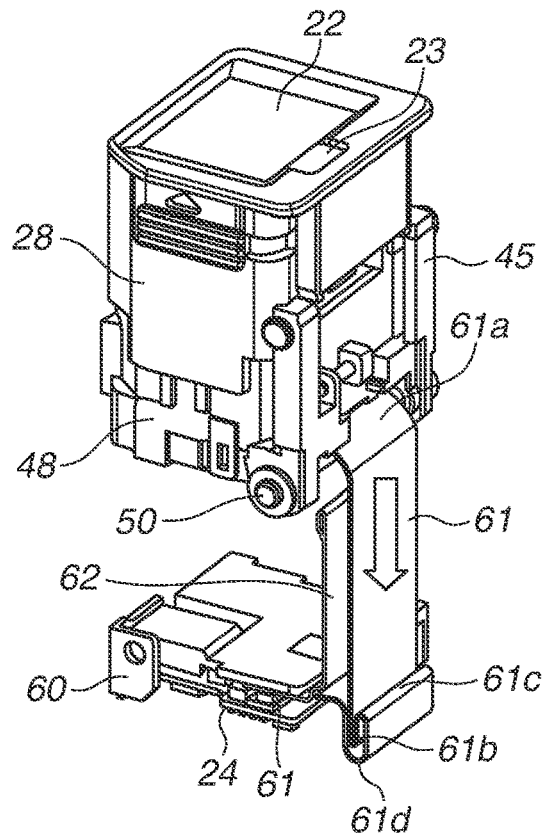

Next, a layout of the flexible board 61 inside the electronic viewfinder unit 21 is described with reference to FIGS. 8A and 8B.

The image capturing apparatus 1 includes the electronic viewfinder unit 21 that can move between the stored state of being stored in the camera main body and the projecting state of being projecting from the camera main body.

The electronic viewfinder unit 21 includes the finder turning unit 41 that includes the electronic display unit 46, and the exterior cover 49 that covers the finder turning unit 41 as the turning unit.

The finder turning unit 41 can turn around the finder unit rotary shaft 50 held by the exterior cover 49 in the projecting state.

One end of the flexible board 61 connected to the electronic display unit 46 is bent at the finder unit rotary shaft 50, and the other end of the flexible board 61 is connected to the finder board 24 that does not turn together with the finder turning unit 41. Bending amounts of the R portions (also referred to as flexible portions) 61*a* to 61*d* of the flexible board 61 can change depending on turning of the finder turning unit 41.

The exterior cover 49 is integrally formed with the side surfaces (also referred to as installation surfaces) 49*a* on which the finder unit rotary shaft 50 of the finder turning unit 41 is installed and the side surface (also referred to as a connection surface) 49*b* that connects the installation surfaces 49*a*.

The flexible board cover 62 for the flexible board 61 is disposed between the electronic display unit 46 and the connection surface 49*b* when viewed from a direction in which the finder unit rotary shaft 50 extends.

The flexible board 61 is disposed in the gap between the connection surface 49*b* of the exterior cover 49 and the flexible board cover 62 when viewed from the direction in which the finder unit rotary shaft 50 extends.

The flexible board 61 includes the first flexible portion 61*a* on one end side of the flexible board 61 and the second flexible portion 61*d* on the other end side thereof.

The flexible board 61 includes the third flexible portions 61*b* and 61*c* arranged between the first flexible portion 61*a* and the second flexible portion 61*d* in the movable direction of the electronic viewfinder unit 21.

The first flexible portion 61*a* is wound around the finder unit rotary shaft 50.

A radius of the first flexible portion 61*a* is greater than radii of the third flexible portions 61*b* and 61*c*.

A radius of the second flexible portion 61*d* is greater than the radii of the third flexible portions 61*b* and 61*c*.

The display panel urging plate 48 that urges the electronic display unit 46 includes the arm portion 48*a* fixed to the finder fixed barrel 45, and turns together with the finder turning unit 41.

Movable portions of the flexible board 61 are described with reference to FIG. 8B.

In the turning operation of the electronic viewfinder unit 21, the R portion 61*a* of the flexible board 61 is bent near the finder unit rotary shaft 50.

The R portion 61*a* is disposed outside of the finder unit rotary shaft 50, so that the radius of the R portion 61*a* is greater than a shaft radius of the finder unit rotary shaft 50.

The R portion 61*a* moves with the turning operation of the electronic viewfinder unit 21, and thus stress is generated in the flexible board 61.

Thus, the R portion 61*a* having the greater radius can prevent disconnection. FIG. 8B illustrates a state inside the exterior cover 49 when the electronic viewfinder unit 21 is turned approximately 90 degrees.

In a case where the electronic viewfinder unit 21 is turned approximately 90 degrees, the R portion 61*a* moves.

More specifically, a quarter of a circumference of the R portion 61*a* becomes a surplus length portion (flexible portion) in the flexible board 61.

The surplus length portion (flexible portion) caused by the movement passes through the gap between the flexible board cover 62 and the exterior cover 49 and moves toward a direction of an arrow.

Accordingly, the surplus length portion (flexible portion) caused by the movement is absorbed by making a parallel movement of the center of the R portion 61*b*.

The surplus length portion (flexible portion) is absorbed by making the downward parallel movement, so that the R portion 61*b* may be smaller than the radius of the R portion 61*a*.

The flexible board 61 may include a portion for absorbing the surplus length portion (flexible portion) up to a connection terminal portion 61*e*.

As described above, the R portion 61*b* for absorbing the surplus length portion (flexible portion) is provided, and thus the movement of the flexible board 61 due to the turning operation of the electronic viewfinder unit 21 does not affect connection reliability of the connection terminal portion 61*e*.

The R portion 61*c* smaller than the radius of the R portion 61*a* is provided, and thus the R portion 61*b* can include the portion for absorbing the surplus length portion (flexible portion) between the vertical movement pop-up mechanism unit 51 and the front cover 9.

A plurality of portions for absorbing the surplus length portion (flexible portion) is provided on the outside of the electronic viewfinder unit 21, and thus the electronic viewfinder unit 21 can be miniaturized without affecting the connection reliability of the connection terminal portion 61*e*.

According to the present example embodiment, the finder board 24 is fixed to the base plate 32 of the board base 60 with a plurality of fastening screws.

Thus, the finder board 24 is moved vertically by the vertical movement pop-up mechanism unit 51 with respect to the EVF holder 30 of the electronic viewfinder unit 21 illustrated in FIGS. 4A and 4B.

However, in a case where the finder board 24 is not moved vertically, the R portion 61d may be moved. More specifically, in a case where the finder board 24 is not moved vertically, the surplus length portion caused by the vertical movement of the electronic viewfinder unit 21 is absorbed by the R portion 61d.

Stress is generated on the R portion 61d of the flexible board 61 by the vertical movement of the electronic viewfinder unit 21. Thus, disconnection can be prevented by increasing the radius of the R portion 61d.

The R portion 61b and the R portion 61d respectively act as the surplus length portion (flexible portion) for the turning operation of the electronic viewfinder unit 21 and the surplus length portion (flexible portion) for the vertical movement of the electronic viewfinder unit 21, so that the R portion 61b and the R portion 61d act as the surplus length portions (flexible portions) for different movements.

In other words, the flexible board 61 includes the plurality of R portions, i.e., the R portions 61a, 61b, 61c, and 61d at different heights in a vertical movement direction, and the radii of the R portions 61a and 61d on the both ends of the flexible board 61 are greater than the radii of the R portions 61b and 61c on an inner side thereof.

Accordingly, in a case where the movable portions for the vertical movement and the turning operation are included, it is possible to arrange the surplus length portions (flexible portions) in a space-saving manner.

The display panel urging plate 48 is a metal plate and is thermally bonded to the electronic display unit 46 adjoined thereto.

The electronic display unit 46 acts as a heat source that generates heat with improvement in definition and increase in a frame rate. The display panel urging plate 48 is held by the finder fixed barrel 45 and is turned accompanying the turning operation of the finder turning unit 41.

The display panel urging plate 48 is made of a member having thermal conductivity higher than that of the flexible board cover 62 and thus functions as a heat radiation member of the electronic display unit 46.

The other end of the flexible board 61 is connected to the finder board 24, which is fixed to the board base 60.

The board base 60 covers the finder board 24.

The finder board 24 is not exposed to the outside and is protected by the board base 60 in the turning operation of the finder turning unit 41, so that the reliability can be improved.

While the present disclosure has been described with reference to the example embodiments, the present disclosure is not limited to the example embodiments and can be modified or altered within the scope of the gist of the present disclosure.

According to the present disclosure, an image capturing apparatus can be provided that includes a small turnable finder without a projecting portion with respect to a main body of the image capturing apparatus at the time when the finder is not used.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-016310, filed Jan. 31, 2019, which is hereby incorporated by reference herein in its entirety.

What is claimed is:

1. An image capturing apparatus comprising:
an electronic viewfinder unit configured to move between a stored state stored in a main body and a projecting state projecting from the main body,
wherein the electronic viewfinder unit is held to be able to turn in the projecting state and is held not to be able to turn in the stored state,
wherein the electronic viewfinder unit includes a turning unit including an electronic display unit, an eyepiece, and a lens holder configured to hold a lens for guiding a light beam emitted from the electronic display unit to the eyepiece, and an exterior cover configured to cover the turning unit,
wherein the turning unit is configured to turn around a rotary shaft perpendicular to an optical axis of the lens held by the exterior cover in the projecting state, and
wherein the rotary shaft is fitted into a shaft hole portion provided on a fixed barrel included in the turning unit in a turnable manner, and is held by a first surface and a second surface of the exterior cover.

2. The image capturing apparatus according to claim 1, wherein the first surface and the second surface of the exterior cover are parallel to an optical axis direction of the lens and parallel to a movable direction of the electronic viewfinder unit.

3. The image capturing apparatus according to claim 2, wherein the first surface and the second surface of the exterior cover are connected by a third surface located closer to an object than the first surface and the second surface are, and the first surface, the second surface, and the third surface form a U shape in a cross section perpendicular to a storage direction.

4. The image capturing apparatus according to claim 2, wherein the rotary shaft is divided into two bodies including a first shaft penetrating through the first surface of the exterior cover and a second shaft penetrating through the second surface of the exterior cover.

5. The image capturing apparatus according to claim 1, further comprising a restraining unit configured to enable the electronic viewfinder unit to move from the projecting state to the stored state in a case where the optical axis of the lens is parallel to an optical axis of an imaging optical system and to restrain the electronic viewfinder unit from moving from the projecting state to the stored state in a case where the optical axis of the lens forms a predetermined angle with the optical axis of the imaging optical system.

6. The image capturing apparatus according to claim 1, wherein the turning unit includes a guide barrel configured to be stored in the fixed barrel in a linearly movable manner and to hold the lens holder,
wherein the guide barrel is engaged with the eyepiece, and
wherein a bearing portion of the fixed barrel on which the eyepiece is formed includes a first contact portion that comes in contact with a surface of the eyepiece parallel to a display surface of the electronic display unit and a second contact portion that comes in contact with a surface of the eyepiece parallel to the optical axis of the lens.

7. An image capturing apparatus comprising:
an electronic viewfinder unit configured to move between a stored state stored in a main body and a projecting state projecting from the main body,
wherein the electronic viewfinder unit is held to be able to turn in the projecting state and is held not to be able to turn in the stored state, wherein the electronic viewfinder unit includes a turning unit including an electronic display unit, an eyepiece, and a lens holder configured to hold a lens for guiding a light beam emitted from the electronic display unit to the eyepiece, and an exterior cover configured to cover the turning unit, wherein the turning unit is configured to turn around a rotary shaft perpendicular to an optical axis of the lens held by the exterior cover in the projecting state, and wherein the rotary shaft is provided on a side to which the electronic viewfinder unit projects of the electronic display unit in a cross section in a direction perpendicular to the rotary shaft.

8. The image capturing apparatus according to claim 7, wherein the rotary shaft is provided on a side opposite to the eyepiece with respect to the optical axis of the lens relative to the lens holder and on a side to which the electronic viewfinder unit projects of the optical axis of the lens.

9. An image capturing apparatus comprising:

an electronic viewfinder unit configured to move between a viewfinder stored state stored in a main body and a projecting state projecting from the main body in a direction perpendicular to an optical axis of an imaging optical system, wherein the electronic viewfinder unit is held to be able to turn in the projecting state and is held not to be able to turn in the viewfinder stored state, wherein the electronic viewfinder unit includes a turning unit including an electronic display unit, an eyepiece, and a lens holder configured to hold a lens for guiding a light beam emitted from the electronic display unit to the eyepiece, and an exterior cover configured to cover the turning unit, wherein the turning unit has a movable structure for movement between a drawn-out state and a turning unit stored state, the drawn-out state is a state of being drawn out on an optical axis of the lens guiding the light beam to the eyepiece in relation to the exterior cover, and the turning unit stored state is a state of being stored in relation to the exterior cover, wherein the turning unit that is in the turning unit stored state of being stored in relation to the exterior cover turns around a rotary shaft perpendicular to the optical axis of the lens, guiding the light beam to the eyepiece, held by the exterior cover in the projecting state, wherein the rotary shaft is provided on a side opposite to the eyepiece with respect to the optical axis of the lens, guiding the light beam to the eyepiece, relative to the lens holder and on a side to which the electronic viewfinder unit projects of the optical axis of the lens guiding the light beam to the eyepiece.

10. The image capturing apparatus according to claim 9, wherein the rotary shaft is held by a first surface and a second surface of the exterior cover, and wherein the first surface and the second surface of the exterior cover are parallel to an optical axis direction of the lens and parallel to a movable direction of the electronic viewfinder unit.

11. The image capturing apparatus according to claim 10, wherein the first surface and the second surface of the exterior cover are connected by a third surface located closer to an object than the first surface and the second surface are, and the first surface, the second surface, and the third surface form a U shape in a cross section perpendicular to a storage direction.

12. The image capturing apparatus according to claim 10, wherein the rotary shaft is divided into two bodies including a first shaft penetrating through the first surface of the exterior cover and a second shaft penetrating through the second surface of the exterior cover.

13. The image capturing apparatus according to claim 9, further comprising a restraining unit configured to enable the electronic viewfinder unit to move from the projecting state to the viewfinder stored state in a case where the optical axis of the lens is parallel to the optical axis of the imaging optical system and to restrain the electronic viewfinder unit from moving from the projecting state to the viewfinder stored state in a case where the optical axis of the lens forms a predetermined angle with the optical axis of the imaging optical system.

14. The image capturing apparatus according to claim 9, wherein the rotary shaft is fitted into a shaft hole portion provided on a fixed barrel included in the turning unit in a turnable manner, wherein the turning unit includes a guide barrel configured to be stored in the fixed barrel in a linearly movable manner and to hold the lens holder, wherein the guide barrel is engaged with the eyepiece, and wherein a bearing portion of the fixed barrel on which the eyepiece is formed includes a first contact portion that comes in contact with a surface of the eyepiece parallel to a display surface of the electronic display unit and a second contact portion that comes in contact with a surface of the eyepiece parallel to the optical axis of the lens.

* * * * *